United States Patent
Ogasawara et al.

(10) Patent No.: US 6,835,497 B2
(45) Date of Patent: Dec. 28, 2004

(54) NICKEL ELECTRODE FOR ALKALINE STORAGE BATTERY AND ALKALINE STORAGE BATTERY

(75) Inventors: Takeshi Ogasawara, Kobe (JP); Mitsunori Tokuda, Tokushima (JP); Mutsumi Yano, Hirakata (JP); Shin Fujitani, Kobe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 332 days.

(21) Appl. No.: 10/122,208

(22) Filed: Apr. 16, 2002

(65) Prior Publication Data

US 2003/0054247 A1 Mar. 20, 2003

(30) Foreign Application Priority Data

Apr. 17, 2001 (JP) ........................................ 2001-117635
Sep. 10, 2001 (JP) ........................................ 2001-273193

(51) Int. Cl.$^7$ ............................................... H01M 4/32
(52) U.S. Cl. .................... 429/223; 429/232; 429/231.5; 429/233; 429/206; 427/126.1
(58) Field of Search ................................ 429/223, 232, 429/231.5, 233, 206; 427/126.1

(56) References Cited

U.S. PATENT DOCUMENTS 6,083,642 A * 7/2000 Kato et al. .................. 429/223
6,261,720 B1 7/2001 Kimiya et al. .............. 429/223
2001/0000484 A1 4/2001 Haigang ................... 429/218.2

FOREIGN PATENT DOCUMENTS

| JP | 10-040948 | | 2/1998 |
| JP | 10-149821 | | 6/1998 |
| JP | 11-176432 | * | 7/1999 |
| JP | 11-176436 | | 7/1999 |
| JP | 2000-133302 | * | 5/2000 |
| WO | WO 00/60688 | | 4/2000 |

OTHER PUBLICATIONS

Bennet, Phillip D. et al; "Proceedings of the Symposium on Hydrogen and Metal Hydride Batteries"; *The Electrochemical Society, Inc.;* Proc. V. 94–27, pp 296–303.

* cited by examiner

Primary Examiner—Laura Weiner
(74) Attorney, Agent, or Firm—Westerman, Hattori, Daniels & Adrian, LLP

(57) ABSTRACT

A nickel electrode for alkaline storage battery according to the present invention is formed by applying a paste containing active material particles composed of nickel hydroxide to a conductive substrate and drying said paste, wherein a conductive layer consisting of sodium-containing cobalt oxide is formed on a surface of said active material particles, and titanium powder and/or titanium compound powder is added to the surface of said active material particles, and an alkaline storage battery according to the present invention uses as its positive electrode the above-mentioned nickel electrode for alkaline storage battery.

14 Claims, 1 Drawing Sheet

NICKEL ELECTRODE FOR ALKALINE STORAGE BATTERY AND ALKALINE STORAGE BATTERY

BACKGROUND OF THE INVENTION

1. Field of the Invention

The present invention relates to an alkaline storage battery such as a nickel-metal hydride battery, a nickel-cadmium battery, and the like, and to a nickel electrode for alkaline storage battery used for a positive electrode of the lkaline storage battery as described above, and is particularly characterized in that charge/discharge cycle performance of the alkaline storage battery under high temperature conditions is improved upon bettering the nickel electrode for alkaline storage battery formed by applying a paste containing active material particles composed of nickel hydroxide to a conductive substrate and then drying the paste on the conductive substrate.

2. Description of the Related Art

A conventional alkaline storage battery such as a nickel-metal hydride battery and nickel-cadmium battery, has used as its positive electrode a nickel electrode for alkaline storage battery using nickel hydroxide as an active material.

In the above-mentioned nickel electrode for alkaline storage battery, conductivity of the nickel hydroxide used as the active material is low. Accordingly, a sintered nickel electrode formed by impregnating a substrate prepared by filling nickel powder into a conductive substrate such as porous steel sheet and the like and then sintering the conductive substrate having the nickel powder filled therein, with nickel hydroxide as the active material has been conventionally used.

However, in such sintered nickel electrode, close adherence between particles of the nickel powder is weak. Accordingly, the nickel powder drops out easily when the substrate having high degree of porosity is used. Therefore, the maximum porosity of such substrate is 80% in actual conditions, and hence, the nickel hydroxide as the active material is not sufficiently filled, thus an alkaline storage battery having a large capacity was hardly attained.

Further, in the above-mentioned sintered nickel electrode, substrate including the porous steel sheet is used, thus, filling density of the active material is generally small. In addition, a pore diameter of the nickel powder formed by sintering is generally small, for example, not more than 10 $\mu$m. Thus, in filling the active material into the substrate, solution impregnating method in which laborious work is repeatedly performed for cycles must be taken, thereby degrading productivity.

Therefore, a paste type nickel electrode for alkaline storage battery formed by applying a paste which is obtained by mixing the active material particles composed of nickel hydroxide with an aqueous solution as a binding agent such as methyl cellulose to a conductive substrate having the high degree of porosity such as foamed nickel and drying said paste has been used.

In such paste type nickel electrode for alkaline storage battery, the conductive substrate having the porosity of not less than 95% can be used. Accordingly, a large number of active materials can be filled into the conductive substrate, thus the alkaline storage battery having the large capacity is attained, and the active materials can be easily filled into the conductive substrate, thereby improving the productivity.

However, in such paste type nickel electrode for alkaline storage battery, when the conductive substrate having the high degree of porosity is used to fill the large number of active materials therein, current collectivity of the conductive substrate is degraded, thereby reducing the utilization efficiency of the active materials.

Therefore, in recent years, in such paste type nickel electrode for alkaline storage battery, a method in which metal cobalt or a cobalt compound composed of a cobalt oxide or a hydroxide as a conductive agent are added to the above-mentioned active material particles composed of nickel hydroxide, then the above-mentioned metal cobalt or the cobalt compound are oxidized to $\beta$-CoOOH which is cobalt oxyhydroxide by charge, to increase the conductivity of the electrode, thus to improve the utilization efficiency of the active materials has been used.

However, even in a case in which the metal cobalt or the cobalt compound as the conductive agent are added to the active material particles composed of nickel hydroxide, there still have remained problems that when the paste type nickel electrode for alkaline storage battery is used as the positive electrode of the alkaline storage battery and is charged under high temperature conditions, an oxygen overvoltage in the positive electrode is decreased, thus in addition to a charge reactivity in which nickel hydroxide is oxidized to nickel oxyhydroxide, a side reaction in which an oxygen evolution reactivity occurs and hence, charge characteristics is decreased have occurred.

In this connection, Japanese Laid-Open No. Shou 57-187869 proposes to add at least one of metal titanium, titanium oxide, and titanium hydroxide to the active material composed of nickel hydroxide as well as to use an alkaline electrolyte solution containing lithium ion in order to improve charge/discharge efficiency of the alkaline storage battery upon improving the utilization efficiency of the nickel electrode.

However, in the alkaline storage battery in which at least one of metal titanium, titanium oxide, and titanium hydroxide is added to the active material composed of nickel hydroxide and alkaline electrolyte solution containing lithium ion is used, there have remained problems that the current collectivity of the electrode is degraded, and sufficient discharge capacity is not attained.

SUMMARY OF THE INVENTION

An object of the present invention is to increase current collectivity and to improve utilization efficiency of active material of a nickel electrode for alkaline storage battery formed by applying paste containing active material particles composed of nickel hydroxide to a conductive substrate and then drying the paste on the conductive substrate.

Another object of the present invention is, in a case in which an alkaline storage battery using as its positive electrode the above-mentioned nickel electrode for alkaline storage battery is charged and discharged under high temperature conditions, to prevent discharge capacity of the alkaline storage battery from gradually decreasing and to improve charge/discharge cycle performance under high temperature conditions.

The nickel electrode for alkaline storage battery of the present invention is formed by applying the paste containing the active material particles composed of nickel hydroxide to the conductive substrate and then drying the paste on the conductive substrate, wherein a conductive layer consisting of sodium-containing cobalt oxide is formed on a surface of the above-mentioned active material particles, and titanium powder and/or titanium compound powder is added to the active material particles.

Further, when the conductive layer consisting of sodium-containing cobalt oxide is formed on the surface of the active material particles composed of nickel hydroxide as the nickel electrode for alkaline storage battery of the present invention, the current collectivity inside the electrode becomes higher, thus the utilization efficiency of the active material is improved, because electrical conductivity of the sodium-containing cobalt oxide is higher than that of metal cobalt or cobalt compound.

When charge/discharge is performed to the alkaline storage battery using as its positive electrode the nickel electrode for alkaline storage battery under high temperature conditions, the sodium-containing cobalt oxide is prevented from being reduced to the cobalt hydroxide during discharge and dissolving into an alkaline electrolyte solution of the alkaline storage battery.

In addition, when the titanium powder and/or titanium compound powder is added to the active material particles which are composed of nickel hydroxide, and on which the conductive layer consisting of sodium-containing cobalt oxide is formed, the speed for which the cobalt hydroxide dissolves into the alkaline electrolyte solution and deposits is delayed for the effect of the titanium and/or titanium compound even in the case in which a part of sodium-containing cobalt oxide is reduced the cobalt hydroxide. As a result, the cobalt hydroxide is prevented from segregating on the surface of the active material particles, and hence, a part of the cobalt hydroxide is restrained from diffusing in the pore of the active material particles, thus, the charge/discharge cycle performance under high temperature conditions is improved.

In the nickel electrode for alkaline storage battery of the present invention, in forming the conductive layer consisting of sodium-containing cobalt oxide on the surface of the active material particles composed of nickel hydroxide, metal cobalt powder, cobalt hydroxide powder, cobalt monoxide powder, and cobalt oxyhydroxide powder are mixed with the active material particles to prepare a mixture. Alternatively, the layer consisting of metal cobalt, cobalt hydroxide, cobalt monoxide or cobalt oxyhydroxide is formed on the surface of the active material particles. Afterward, sodium hydroxide aqueous solution is added to the aforementioned resultant mixture or layer, and then is subject to heat-treating at the temperature of 50 to 200° C. under the presence of oxygen, to form the above-mentioned conductive layer.

In heat-treating, the temperature is set in the range of 50 to 200° C. because in the case in which the temperature is not more than 50° C., $CoHO_2$ which is low in the electric conductivity deposits, while in the case in which the temperature is not less than 200° C., 3-cobalt tetraoxide $Co_3O_4$ which is low in the electric conductivity deposits, accordingly in both cases, the conductive layer having high conductivity is not attained. When the cobalt oxyhydroxide particles are added to the surface of the active material particles, or the layer consisting of the cobalt oxyhydroxide is formed on the surface of the active material particles, $CoHO_2$ does not deposit even in the case in which the heat-treating temperature is not more than 50° C. However, sodium is hardly contained, accordingly the conductive layer having the high conductivity is not attained. Time for the above-mentioned heat-treating is not especially limited but is altered appropriately depending on concentration of the sodium hydroxide to be used or the heat-treating temperature. The time is approximately set in the range of 0.5 to 10 hours.

Further, in the case in which the conductive layer consisting of sodium-containing cobalt oxide is formed on the surface of the active material particles composed of nickel hydroxide as mentioned above, a chemical structure of the sodium-containing cobalt oxide is uncertain. However, electric conductivity thereof is extremely high, therefore, the sodium-containing cobalt oxide is expected to be not a mere mixture of cobalt oxide and sodium but an intercalation complex having a structure of sodium being interposed into cobalt oxide crystals.

The above-mentioned layer consisting of metal cobalt, cobalt hydroxide, or cobalt monoxide is formed on the surface of the active material particles composed of the nickel hydroxide by mechanical charging method in which metal cobalt powder, cobalt hydroxide powder, or cobalt monoxide powder is added to the nickel hydroxide powder, and then said nickel hydroxide powder is dry mixed by a compressible crusher under inert-gas atmosphere.

The above-mentioned layer consisting of cobalt hydroxide is formed on the surface of the active material particles composed of nickel hydroxide by the steps of adding nickel hydroxide powder to a cobalt salt aqueous solution such as cobalt nitrate, dropping an alkaline aqueous solution such as a sodium hydroxide aqueous solution into an obtained mixture while agitating the obtained mixture to adjust the pH of the solution to around 11, reacting a resultant solution for an appointed time while agitating the resultant solution, and depositing cobalt hydroxide on the surface of the nickel hydroxide particles.

The above-mentioned layer consisting of the cobalt oxyhydroxide is formed on the surface of the active material particles composed of nickel hydroxide, for example, by the steps of forming the layer consisting of cobalt hydroxide on the surface of the active material particles composed of nickel hydroxide, and reacting the layer thus formed with hydrogen peroxide water which is heated to about 40° C., and oxidizing the cobalt hydroxide In forming the conductive layer consisting of the sodium-containing cobalt oxide on the surface of the active material particles composed of nickel hydroxide as mentioned above, when the weight ratio of the conductive layer based on the active material particles is too small, the conductivity of the nickel electrode for alkaline storage battery is not fully improved. On the other hand, when the weight ratio of the conductive layer based on the active material particles is too large, the ratio of the nickel hydroxide in the nickel electrode for alkaline storage battery is decreased, thereby decreasing the discharge capacity. Therefore, the weight ratio of cobalt element in the conductive layer based on the active material particles composed of nickel hydroxide is preferably set in the range of 1 to 10 wt %.

In the above-mentioned conductive layer consisting of the sodium-containing cobalt oxide, when the weight ratio of the sodium element in the sodium-containing cobalt oxide is too small or too large, the sodium-containing cobalt oxide is easily reduced to cobalt hydroxide during discharge under high temperature conditions as the result of both cases. Therefore, the weight ratio of the sodium element in the sodium-containing cobalt oxide is preferably set in the range of 0.1 to 10 wt %.

In adding the titanium powder and/or the titanium compound powder to the surface of the active material particles on which the above-mentioned conductive layer is formed, when an additive weight ratio is too small, the charge/discharge cycle performance under high temperature conditions is not fully prevented from decreasing. On the other hand, when the additive weight ratio is too large, the ratio of nickel hydroxide in the nickel electrode for alkaline storage battery is decreased, thereby decreasing the discharge capacity. Therefore, the weight ratio of a titanium element in the titanium powder and/or the titanium compound powder to be added based on a total weight of the active material particles composed of the nickel hydroxide and the above-mentioned conductive layer formed thereon is preferably set in the range of 0.2 to 4.0 wt %.

Examples of the above-mentioned titanium compound include $TiO_2$, $TiO$, $Ti_2O_3$, $Ti(OH)_4$, $Ti(OH)_2$, $Ti(OH)_3$, $TiO_2 \cdot xH_2O$.

When a particle diameter of the above-mentioned titanium powder and/or the titanium compound powder is too large, an area in which the titanium powder and/or the titanium compound powder contacts with the surface of the active material particles on which the conductive layer is formed is decreased, thus sufficient effect is not attained. Therefore, the titanium powder and/or the titanium compound powder having an average particle diameter of not more than 100 μm is preferably used.

In the nickel electrode for alkaline storage battery of the present invention, at least one element selected from a group consisting of zinc, cobalt, calcium, magnesium, aluminum, manganese, yttrium, and ytterbium is preferably incorporated into the above-mentioned active material particles composed of the nickel hydroxide, and the ratio of these elements based on the total weight of the nickel in the above-mentioned nickel hydroxide and these elements is preferably set to not more than 10 atomic % to prevent the potassium ion and the like in the alkaline electrolyte solution from being intercalated into the crystal of the nickel hydroxide as the active material for the effect of these elements thus incorporated, thus to prevent the decrease of the charge/discharge capacity by dry out of the alkaline electrolyte solution. Especially, when at least one of zinc and cobalt is incorporated, the decrease of the charge/discharge capacity by dry out of the alkaline electrolyte solution is further prevented because of a greater effect of these two elements.

In addition, in the nickel electrode for alkaline storage battery of the present invention, it is preferable that at least one element powder and/or its compound powder selected from the group consisting of yttrium, ytterbium, calcium, aluminum, erbium, gadolinium, thulium, lutetium, zinc, niobium, tungsten, and tantalum in addition to titanium powder and/or the titanium compound powder is added to the surface of the active material particles on which the conductive layer consisting of sodium-containing cobalt oxide is formed. When the selected element powder and/or its compound powder is added, charge/discharge cycle performance under high temperature conditions is further improved. Especially, when at least one element powder and/or its compound powder selected from the group consisting of yttrium, niobium, tungsten, and tantalum is added, charge/discharge cycle performance under high temperature conditions is remarkably improved because of the greater effect. In particular, when $Y_2O_3$ which is an yttrium compound is added, charge/discharge cycle performance under high temperature conditions is more remarkably improved.

In the nickel electrode for alkaline storage battery of the present invention, examples of the above-mentioned conductive substrate on which the paste containing active material particles is applied include foamed nickel, felt metal fiber, and punching metal.

Further, in the alkaline storage battery using as its positive electrode the above-mentioned nickel electrode for alkaline storage battery, an alkaline electrolyte solution containing potassium, lithium, and sodium is preferably used in order to improve charge characteristic under high temperature conditions, thus to restrain oxygen evolution at excessive charge. Especially, an alkaline electrolyte solution containing 4 to 10 mol/l of potassium hydroxide, 0.1 to 2 mol/l of lithium hydroxide, and 0.2 to 4.0 mol/l of sodium hydroxide is more preferably used.

Examples of the alkaline storage battery using as its positive electrode the above-mentioned nickel electrode for alkaline storage battery include a nickel-metal hydride battery using as its negative electrode a hydrogen absorbing alloy electrode, a nickel-cadmium battery using as its negative electrode a cadmium electrode, and a nickel-zinc battery using as its negative electrode a zinc electrode.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
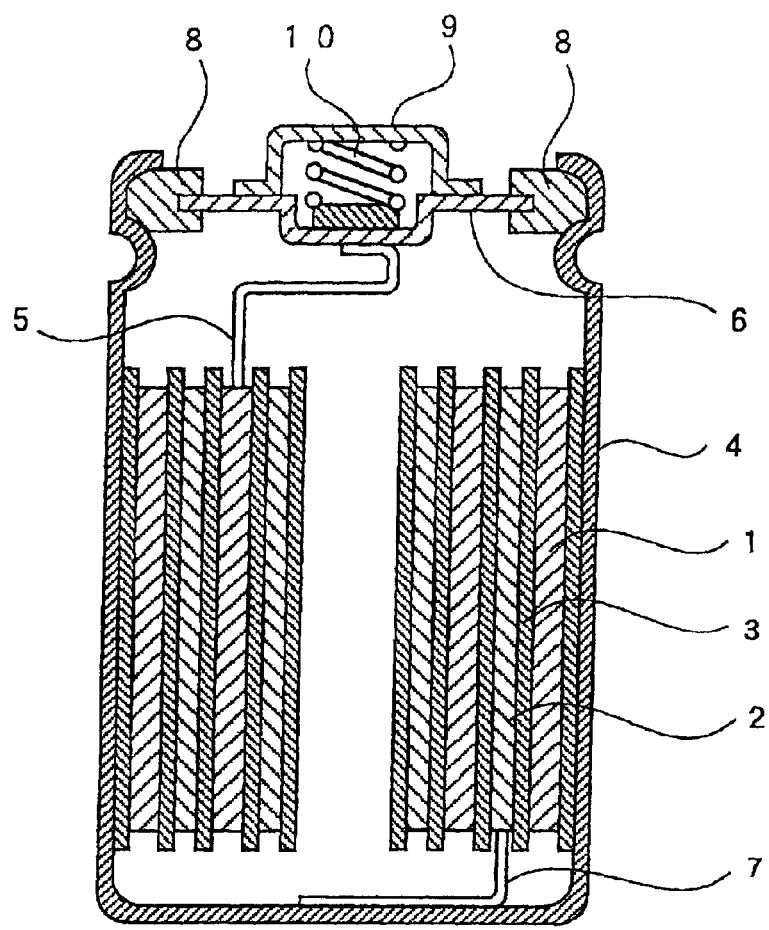
FIG. 1 is a schematic sectional view of each of alkaline storage batteries fabricated in examples and comparative examples of the invention.

The following examples specifically illustrate a nickel electrode for alkaline storage battery and an alkaline storage battery employing as its positive electrode the nickel electrode for alkaline storage battery. Further, comparative examples will be taken to make it clear that in each of the alkaline storage battery of the examples, charge/discharge cycle performance under high temperature conditions is improved. It should be appreciated that the nickel electrode for alkaline storage battery and the alkaline storage battery of the present invention are not particularly limited to those in the following examples, and various changes and modifications may be made in the invention without departing from the spirit and scope thereof.

EXAMPLE 1

In example 1, in fabricating a nickel electrode for alkaline storage battery, 100 g of nickel hydroxide powder as an active material was dissolved in 1 liter of a cobalt sulfate aqueous solution containing 10.5 g of cobalt sulfate. While agitating an obtained mixture, 10 wt % of a sodium hydroxide aqueous solution was added to the obtained mixture to adjust the pH of the solution to around 11, and an agitation was continued for an hour. Precipitate thus obtained was filtered, was rinsed, and was vacuum dried to obtain powder wherein a layer consisting of cobalt hydroxide was formed on a surface of nickel hydroxide particles as the active material.

Subsequently, the powder wherein the layer consisting of cobalt hydroxide was formed on the surface of the nickel hydroxide particles and 25 wt % of sodium hydroxide aqueous solution were mixed in a weight ratio of 1:10, were heat-treated for 5 hours at the temperature of 90° C., were rinsed, and then, were dried at the temperature of 60° C., to obtain the powder wherein a conductive layer consisting of sodium-containing cobalt oxide was formed on the surface of the nickel hydroxide particles as the active material.

When the conductive layer consisting of sodium-containing cobalt oxide was formed on the surface of the nickel hydroxide particles as the active material, the weight ratio of cobalt element in the conductive layer based on nickel hydroxide particles as the active material was 4 wt %.

Further, in order to measure the weight ratio of sodium in the above-mentioned conductive layer consisting of sodium-containing cobalt oxide, cobalt hydroxide powder and 25 wt % of sodium hydroxide aqueous solution were mixed in a weight ratio of 1:10, were heat-treated at the temperature of 90° C. for 5 hours, were rinsed, and were dried at the temperature of 60° C. to form the sodium-containing cobalt oxide in the same manner as the above-mentioned case. As to the sodium-containing cobalt oxide, the weight ratio of sodium element Na in the sodium-containing cobalt oxide measured by atomic absorption spectroscopy was 1 wt %, and a valence of cabalt measured by redox titration was 3.1.

The above-mentioned nickel hydroxide particles on which the conductive layer consisting of sodium-containing cobalt oxide was formed was mixed with $TiO_2$ powder having the average particle diameter of 1 μm which is a titanium compound in the weight ratio of 100:3.34, subsequently, 20 parts by weight of a methylcellulose aqueous solution having a concentration of 1 wt % as a binding agent was added to 100 parts by weight of the mixture thus obtained, followed by mixing to prepare a paste. The paste thus obtained was filled into foamed nickel as a conductive substrate having a porosity of 95% and an average pore diameter of 200 μm. The paste was dried and pressure-formed to form the nickel electrode for alkaline storage battery. In the nickel electrode for alkaline storage battery, the weight ratio of the titanium element Ti based on the total weight of the nickel hydroxide particles and the conductive layer consisting of sodium-containing cobalt oxide was 2.0 wt %.

The nickel electrode for alkaline storage battery thus formed was used as a positive electrode while a generally used paste-type cadmium electrode was used as a negative electrode, and polyamide non-woven fabric was used as a separator, and an aqueous solution containing 336.6 g. of KOH, 20.0 g. of NaOH, and 41.9 g. of $LiOH.H_2O$ per 1 liter was used as an alkaline electrolyte solution, to fabricate an alkaline storage battery of AA-size as shown in FIG. 1. In the alkaline electrolyte solution, concentration of potassium hydroxide, sodium hydroxide, and lithium hydroxide was respectively 6.0 mol/l, 0.5 mol/l, and 1.0 mol/l.

In fabricating the alkaline storage battery, a separator 3 was interposed between a positive electrode 1 and a negative electrode 2, was wound up in a spiral shape, and was contained in a battery can 4. Thereafter, the alkaline electrolyte solution was poured into the battery can 4, to seal the battery can 4. The positive electrode 1 was connected to a positive electrode cover 6 through a positive electrode lead 5, and the negative electrode 2 was connected to the battery can 4 through a negative electrode lead 7. The battery can 4 and the positive electrode cover 6 were electrically deposited by an insulating packing 8.

A coil spring 10 was provided between the positive electrode cover 6 and a positive electrode external terminal 9. When the internal pressure of the battery was abnormally raised, the coil spring 10 was compressed so that gas inside the battery was released into the air.

EXAMPLE 2

In example 2, in forming the nickel electrode for alkaline storage battery, the powder wherein the conductive layer consisting of sodium-containing cobalt oxide was formed on the surface of the nickel hydroxide particles as the active material was obtained in the same manner as in the example 1.

The nickel hydroxide particles on which the conductive layer consisting of sodium-containing cobalt oxide was formed was mixed with Ti powder in the weight ratio of 100:2. Except for the above, the same procedure as that in the example 1 was taken to form a nickel electrode for alkaline storage battery.

Except that the nickel electrode for alkaline storage battery thus formed was used as the positive electrode, the same procedure as that in the example 1 was taken to fabricate an alkaline storage battery of the example 2.

EXAMPLE 3

In example 3, in forming the nickel electrode for alkaline storage battery, the powder wherein the conductive layer consisting of sodium-containing cobalt oxide was formed on the surface of the nickel hydroxide particles as the active material was obtained in the same manner as in the example 1.

The nickel hydroxide particles on which the conductive layer consisting of sodium-containing cobalt oxide was formed was mixed with $TiO_2$ powder having the average particle diameter of 1.0 μm and Ti powder having the average particle diameter of 1.0 μm in the weight ratio of 100:1.67:1. Except for the above, the same procedure as that in the example 1 was taken to form a nickel electrode for alkaline storage battery. In the nickel electrode for alkaline storage battery, the weight ratio of the titanium element Ti based on the total weight of the nickel hydroxide particles and the conductive layer consisting of sodium-containing cobalt oxide was 2.0 wt %.

Except that the nickel electrode for alkaline storage battery thus formed was used as the positive electrode, the same procedure as that in the example 1 was taken to fabricate an alkaline storage battery of the example 3.

Comparative Example 1

In the comparative example 1, in forming the nickel electrode for alkaline storage battery, the powder wherein the conductive layer consisting of sodium-containing cobalt oxide was formed on the surface of the nickel hydroxide particles as the active material was obtained in the same manner as in the example 1, then the powder thus obtained was not mixed with $TiO_2$ powder.

20 parts by weight of the methylcellulose aqueous solution having the concentration of 1 wt % as the binding agent was added to 100 parts by weight of the nickel hydroxide particles on which the conductive layer consisting only of sodium-containing cobalt oxide was formed. Except for the above, the same procedure as that in the example 1 was taken to form a nickel electrode for alkaline storage battery.

Except that the nickel electrode for alkaline storage battery thus formed was used as the positive electrode, the same procedure as that in the example 1 was taken to fabricate an alkaline storage battery of the comparative example 1.

Comparative Example 2

In the comparative example 2, in forming the nickel electrode for alkaline storage battery, nickel hydroxide powder as the active material, metal cobalt powder, and $TiO_2$ powder having the average particle diameter of 1.0 μm were mixed in the weight ratio of 100:8.3:3.34. Subsequently, 20 parts by weight of the methylcellulose aqueous solution having the concentration of 1 wt % as the binding agent was added to 100 parts by weight of the mixture thus obtained to prepare a paste. The paste thus obtained was filled into the foamed nickel as the conductive substrate having the porosity of 95% and the average pore diameter of 200 μm. The paste was dried and pressure-formed to form a nickel electrode for alkaline storage battery.

Except that the nickel electrode for alkaline storage battery thus formed was used as the positive electrode, the same procedure as that in the example 1 was taken to fabricate an alkaline storage battery of the comparative example 2.

Comparative Example 3

In the comparative example 3, in forming the nickel electrode for alkaline storage battery, the layer consisting of cobalt hydroxide was formed on the surface of the nickel hydroxide particles as the active material in the same manner as the above-mentioned example 1, then the nickel hydroxide particles as the active material was not treated with the sodium hydroxide aqueous solution, thus the nickel hydroxide particles on which the layer consisting of cobalt hydroxide was formed were used.

The nickel hydroxide particles on which the layer consisting of cobalt hydroxide was formed and $TiO_2$ powder having the average particle diameter of 1.0 μm were mixed in the weight ratio of 100:3.34. Except for the above, the same procedure as that in the example 1 was taken to form a nickel electrode for alkaline storage battery.

Except that the nickel electrode for alkaline storage battery thus formed was used as the positive electrode, the same procedure as that in the example 1 was taken to fabricate an alkaline storage battery of the comparative example 3.

Subsequently, each of the alkaline storage batteries of the examples 1 to 3 and comparative examples 1 to 3 was respectively charged at a charging current of 100 mA for 16 hours under a temperature condition of 25° C. and was discharged to 1.0 V at a discharging current of 1000 mA. Charge/discharge was regarded as one cycle. Five cycles of the charge/discharge were performed to find a discharge capacity at the fifth cycle of each of the alkaline storage batteries of the examples 1 to 3 and comparative examples 1 to 3.

The discharge capacity at the fifth cycle of the alkaline storage battery of the example 1 was set to 100, to find a relative index of the discharge capacity which was regarded as capacity performance of the alkaline storage batteries of the examples 1 to 3 and comparative examples 1 to 3. The results were shown in the Table 1.

Further, each of the above-mentioned alkaline storage batteries of the examples 1 to 3 and comparative examples 1 to 3 to which 5 cycles of the charge/discharge were carried out was further charged at the charging current of 500 mA for 2 hours under a high temperature condition of 60° C. and was discharged to 1.0 V at the discharging current of 500 mA. The charge/discharge was regarded as one cycle. The charge/discharge cycle test was performed, to find number of cycles until the discharge capacity was decreased to not more than 80% of the discharge capacity at the first cycle under the high temperature condition of 60° C.

The number of cycles of the alkaline storage battery of the example 1 was set to 100, to find the relative index of the number of cycles which was regarded as the charge/discharge cycle performance of the alkaline storage batteries of the examples 1 to 3 and comparative examples 1 to 3. The results were shown in the Table 1.

TABLE 1

| | type of conductive agent | type of additive agent | capacity performance | charge/discharge cycle performance |
|---|---|---|---|---|
| example 1 | Na—containing Co oxide | $TiO_2$ | 100 | 100 |
| example 2 | Na—containing Co oxide | Ti | 100 | 98 |
| example 3 | Na—containing Co oxide | $TiO_2$ + Ti | 100 | 100 |
| comparative example 1 | Na—containing Co oxide | — | 99 | 60 |
| comparative example 2 | metal cobalt | $TiO_2$ | 84 | 45 |
| comparative example 3 | cobalt hydroxide | $TiO_2$ | 88 | 44 |

As apparent from the results, each of the alkaline storage batteries of the examples 1 to 3 using as the positive electrode the nickel electrode for alkaline storage battery using the powder wherein the conductive layer consisting of sodium-containing cobalt oxide was formed on the surface of the nickel hydroxide particles as the active material and the titanium powder and/or titanium compound powder was added to the nickel hydroxide particles was improved in the charge/discharge cycle performance under the high temperature conditions compared with the alkaline storage batteries of the comparative examples 1 to 3.

EXAMPLES A1 to A4

In examples A1 to A4, in forming the nickel electrode for alkaline storage battery, the layer consisting of cobalt hydroxide was formed on the surface of the nickel hydroxide particles as the active material in the same manner as the above-mentioned example 1.

In treating the nickel hydroxide particles on which the layer consisting of cobalt hydroxide was formed with the sodium hydroxide aqueous solution to form the conductive layer consisting of sodium-containing cobalt oxide on the surface of the nickel hydroxide particles, 5 wt % of the sodium hydroxide aqueous solution in the example A1, 10 wt % of the sodium hydroxide aqueous solution in the example A2, 40 wt % of the sodium hydroxide aqueous solution in the example A3, and 45 wt % of the sodium hydroxide aqueous solution in the example A4 was respectively used. Except for the above, the same procedure as that in the example 1 was taken to form each of the nickel electrodes for alkaline storage battery.

In order to measure the weight ratio of the sodium in the above-mentioned conductive layer consisting of sodium-containing cobalt oxide formed on the surface of the nickel hydroxide particles, 5 wt % of the sodium hydroxide aqueous solution, 10 wt % of the sodium hydroxide aqueous solution, 40 wt % of the sodium hydroxide aqueous solution, and 45 wt % of the sodium hydroxide aqueous solution was respectively mixed cobalt hydroxide powder in the weight ratio of 1:10, were heat-treated at the temperature of 90° C. for 5 hours, were rinsed, and were dried at the temperature of 60° C. to form each of the sodium-containing cobalt oxide. The weight ratio of sodium element Na in each of the sodium-containing cobalt oxide thus formed, measured by the atomic absorption spectroscopy was respectively 0.05 wt % in the case corresponding to the example A1, 0.1 wt % in the case corresponding to the example A2, 10 wt % in the case corresponding to the example A3, and 12 wt % in the case corresponding to the example A4.

Except that each of the nickel electrodes for alkaline storage battery thus formed was used as the positive electrode, the same procedure as that in the example 1 was taken to fabricate each of alkaline storage batteries of the examples A1 to A4.

Subsequently, 5 cycles of charge/discharge were performed to each of the alkaline storage batteries of the examples A1 to A4 under the temperature condition of 25° C. to find the discharge capacity at the fifth cycle, then, the charge/discharge was performed repeatedly under the high temperature condition of 60° C. to find the number of cycles until the discharge capacity was decreased to not more than 80% of the discharge capacity at the first cycle under the high temperature condition of 60° C.

The discharge capacity at the fifth cycle and the number of cycles of the alkaline storage battery of the example 1 was set to 100, to find the discharge capacity and the relative index of the number of cycles which were respectively regarded as the capacity performance and the charge/discharge cycle performance of the alkaline storage batteries of the examples A1 to A4. The results were shown in the Table 2.

TABLE 2

| | weight ratio of Na in Na—containing Co oxide (wt %) | capacity performance | charge/discharge cycle performance |
|---|---|---|---|
| example A1 | 0.05 | 88 | 65 |
| example A2 | 0.1 | 95 | 92 |
| example 1 | 1 | 100 | 100 |
| example A3 | 10 | 99 | 99 |
| example A4 | 12 | 89 | 97 |

As a result, each of the alkaline storage batteries of the examples 1, A2, and A3 using the nickel electrodes for alkaline storage battery in which the conductive layer consisting of sodium-containing cobalt oxide which was containing 0.1 to 10.0 wt % of sodium element was formed was improved in the capacity performance and the charge/discharge cycle performance under high temperature conditions compared with the alkaline storage battery of the examples A1 using the nickel electrode for alkaline storage battery in which the conductive layer which was containing 0.05 wt % of sodium element was formed, and was also improved in the capacity performance compared with the alkaline storage battery of the examples A4 using the nickel electrode for alkaline storage battery in which the conductive layer which was containing 12 wt % of sodium element was formed.

EXAMPLES B1 to B4

In the examples B1 to B4, in forming the nickel electrode for alkaline storage battery, the amount of the cobalt sulfate in the cobalt sulfate aqueous solution per liter adopted in the example 1 was changed, and was respectively set to 1.31 g in the example B1, 2.63 g in the example B2, 26.3 g in the example B3, and 31.6 g in the example B4. Except for the above, the same procedure as that in the example 1 was taken to form each of nickel electrodes for alkaline storage battery.

In each of the nickel electrodes for alkaline storage battery thus formed, a ratio of the cobalt element Co in the conductive layer consisting of sodium-containing cobalt oxide formed on the surface of the nickel hydroxide particles as the active material based on the nickel hydroxide particles as the active material was 0.5 wt % in the example B1, 1.0 wt % in the example B2, 10.0 wt % in the example B3, and 12 wt % in the example B4 as shown in the following Table 3.

Except that each of the nickel electrodes for alkaline storage battery thus formed was used as the positive electrode, the same procedure as that in the example 1 was taken to fabricate each of alkaline storage batteries of the examples B1 to B4.

Subsequently, 5 cycles of charge/discharge were performed to each of the alkaline storage batteries of the examples B1 to B4 under the temperature condition of 25° C. to find the discharge capacity at the fifth cycle, then, the charge/discharge was performed repeatedly under the high temperature condition of 60° C. to find the number of cycles until the discharge capacity was decreased to not more than 80% of the discharge capacity at the first cycle under the high temperature condition of 60° C.

The discharge capacity at the fifth cycle and the number of cycles of the alkaline storage battery of the example 1 was set to 100, to find the discharge capacity and the relative index of the number of cycles which were respectively regarded as the capacity performance and the charge/discharge cycle performance of the alkaline storage batteries of the examples B1 to B4. The results were shown in the Table 3.

TABLE 3

| | ratio of Co based on active material particles (wt %) | capacity performance | charge/discharge cycle performance |
|---|---|---|---|
| example B1 | 0.5 | 89 | 74 |
| example B2 | 1 | 98 | 98 |
| example 1 | 4 | 100 | 100 |
| example B3 | 10 | 95 | 100 |
| example B4 | 12 | 88 | 100 |

As a result, each of the alkaline storage batteries of the examples 1, B2, and B3 using the nickel electrodes for alkaline storage battery in which the weight ratio of the cobalt element in the conductive layer consisting of sodium-containing cobalt oxide based on the nickel hydroxide particles as the active material was in the range of 1.0 to 10.0 wt % was improved in the capacity performance and the charge/discharge cycle performance under high temperature conditions compared with the alkaline storage battery of the example B1 using the nickel electrode for alkaline storage battery in which the weight ratio of the cobalt element was 0.5 wt %, and was also improved in the capacity performance compared with the alkaline storage battery of the example B4 using the nickel electrode for alkaline storage battery in which the weight ratio of the cobalt element was 12 wt %.

EXAMPLES C1 to C7

In the examples C1 to C7, in forming the nickel electrode for alkaline storage battery, the conductive layer consisting of sodium-containing cobalt oxide was formed on the surface of the nickel hydroxide particles as the active material in the same manner as the above-mentioned example 1.

In mixing the nickel hydroxide particles on which the conductive layer consisting of sodium-containing cobalt oxide was formed with the TiO$_2$ powder having the average particle diameter of 1 μm, the weight ratio between the nickel hydroxide particles on which the conductive layer was formed and the TiO$_2$ powder having the average particle diameter of 1.0 μm was respectively set to 100:0.017 in the example C1, 100:0.08 in the example C2, 100:0.33 in the example C3, 100:1.67 in the example C4, 100:5.00 in the example C5, 100:6.67 in the example C6, and 100:8.34 in the example C7. Except for the above, the same procedure as that in the example 1 was taken to form each of the nickel electrodes for alkaline storage battery.

In each of the nickel electrodes for alkaline storage battery thus formed, the ratio of the titanium element Ti based on the total weight of the nickel hydroxide particles and the conductive layer consisting of sodium-containing cobalt oxide was 0.01 wt % in the example C1, 0.05 wt % in the example C2, 0.2 wt % in the example C3, 1 wt % in the example C4, 3 wt % in the example C5, 4 wt % in the example C6, and 5 wt % in the example C7 as shown in the following Table 4.

Except that each of the nickel electrodes for alkaline storage battery thus formed was used as the positive electrode, the same procedure as that in the example 1 was taken to fabricate each of alkaline storage batteries of the examples C1 to C7.

Subsequently, 5 cycles of charge/discharge were performed to each of the alkaline storage batteries of the examples C1 to C7 under the temperature condition of 25° C. to find the discharge capacity at the fifth cycle, then, the charge/discharge was performed repeatedly under the high temperature condition of 60° C. to find the number of cycles until the discharge capacity was decreased to not more than 80% of the discharge capacity at the first cycle under the high temperature condition of 60° C.

The discharge capacity at the fifth cycle and the number of cycles of the alkaline storage battery of the example 1 was set to 100, to find the discharge capacity and the relative index of the number of cycles which were respectively regarded as the capacity performance and the charge/discharge cycle performance of the alkaline storage batteries of the examples C1 to C7. The results were shown in the Table 4.

TABLE 4

| | ratio of Ti based on active material particles on which conductive layer was formed (wt %) | capacity performance | charge/discharge cycle performance |
|---|---|---|---|
| example C1 | 0.01 | 100 | 86 |
| example C2 | 0.05 | 100 | 88 |
| example C3 | 0.2 | 100 | 98 |
| example C4 | 1 | 100 | 99 |
| example 1 | 2 | 100 | 100 |
| example C5 | 3 | 99 | 100 |
| example C6 | 4 | 99 | 100 |
| example C7 | 5 | 92 | 100 |

As a result, each of the alkaline storage batteries of the examples 1 and C3 to C6 using the nickel electrodes for alkaline storage battery in which the ratio of the titanium element based on the total weight of the nickel hydroxide particles and the conductive layer consisting of sodium-containing cobalt oxide was in the range of 0.2 to 4.0 wt % was improved in the charge/discharge cycle performance under high temperature conditions compared with the alkaline storage batteries of the examples C1 and C2 using the nickel electrodes for alkaline storage battery in which the ratio of the titanium element was respectively 0.01 wt % and 0.05 wt %, and was also improved in the capacity performance compared with the alkaline storage battery of the example C7 using the nickel electrode for alkaline storage battery in which the ratio of the titanium element was 5 wt %.

EXAMPLES D1 to D6

In the examples D1 to D6, in forming the nickel electrode for alkaline storage battery, the conductive layer consisting of sodium-containing cobalt oxide was formed on the surface of the nickel hydroxide particles as the active material in the same manner as the above-mentioned example 1.

In mixing the nickel hydroxide particles on which the conductive layer consisting of sodium-containing cobalt oxide was formed with TiO$_2$ powder in the weight ratio of 100:3.34, the average particle diameter of the TiO$_2$ powder was respectively changed. Specifically, the TiO$_2$ powder having the average particle diameter of 0.1 μm in the example D1, 10 μm in the example D2, 20 μm in the example D3, 50 μm in the example D4, 100 μm in the example D5, and 150 μm in the example D6 was respectively used as shown in the following Table 5. Except for the above, the same procedure as that in the example 1 was taken to form each of the nickel electrodes for alkaline storage battery.

Except that each of the nickel electrodes for alkaline storage battery thus formed was used as the positive electrode, the same procedure as that in the example 1 was taken to fabricate each of alkaline storage batteries of the examples D1 to D6.

Subsequently, 5 cycles of charge/discharge were performed to each of the alkaline storage batteries of the examples D1 to D6 under the temperature condition of 25° C. to find the discharge capacity at the fifth cycle, then, the charge discharge was performed repeatedly under the high temperature condition of 60° C. to find number of cycles until the discharge capacity was decreased to not more than 80% of the discharge capacity at the first cycle under the high temperature condition of 60° C.

The discharge capacity at the fifth cycle and the number of cycles of the alkaline storage battery of the example 1 was set to 100, to find the discharge capacity and the relative index of the number of cycles which were respectively regarded as the capacity performance and the charge/discharge cycle performance of the alkaline storage batteries of the examples D1 to D6. The results were shown in the Table 5.

TABLE 5

| | average particle diameter of TiO$_2$ (μm) | capacity performance | charge/discharge cycle performance |
|---|---|---|---|
| example D1 | 0.1 | 100 | 100 |
| example 1 | 1 | 100 | 100 |
| example D2 | 10 | 100 | 100 |
| example D3 | 20 | 99 | 100 |
| example D4 | 50 | 98 | 100 |
| example D5 | 100 | 98 | 96 |
| example D6 | 150 | 97 | 82 |

As a result, each of the alkaline storage batteries of the examples 1 and D1 to D5 using the nickel electrodes for alkaline storage battery in which the TiO$_2$ powder having the average particle diameter of not more than 100 μm was added to the nickel hydroxide particles on which the conductive layer consisting of sodium-containing cobalt oxide was formed was improved in the charge/discharge cycle performance under high temperature conditions compared with the alkaline storage battery of the example D6 using the nickel electrode for alkaline storage battery in which the $TiO_2$ powder having the average particle diameter of 150 μm was added.

EXAMPLES E1 to E15

In the examples E1 to E15, in forming the nickel electrode for alkaline storage battery, the conductive layer consisting of sodium-containing cobalt oxide was formed on the surface of the nickel hydroxide particles as the active material in the same manner as the above-mentioned example 1.

In addition to 3.34 parts by weight of the $TiO_2$ powder having the average particle diameter of 1 μm, 1.00 part by weight of Y powder in the example E1, 1.57 parts by weight of $Y(OH)_3$ powder in the example E2, 1.27 parts by weight of $Y_2O_3$ powder in the example E3, 1.14 parts by weight of $Yb_2O_3$ powder in the example E4, 1.84 parts by weight of $Ca(OH)_2$ powder in the example E5, 2.89 parts by weight of $Al(OH)_3$ powder in the example E6, 1.14 parts by weight of $Er_2O_3$ powder in the example E7, 1.15 pats by weight of $Gd_2O_3$ powder in the example E8, 1.14 parts by weight of $Tm_2O_3$ powder in the example E9, 1.14 parts by weight of $Lu_2O_3$ powder in the example E10, 1.24 parts by weight of ZnO powder in the example E11, 1.43 parts by weight of $Nb_2O_5$ powder in the example E12, 1.26 parts by weight of $WO_3$ powder in the example E13, 1.22 parts by weight of $Ta_2O_5$ powder in the example E14, and 0.63 part by weight of $Y_2O_3$ powder and 0.57 part by weight of $Yb_2O_3$ powder in the example E15 was respectively added to the nickel hydroxide particles on which the conductive layer consisting of sodium-containing cobalt oxide was formed.

When the $TiO_2$ powder and each of the above-mentioned compound powder were mixed with the powder wherein the conductive layer consisting of sodium-containing cobalt oxide was formed on the surface of the nickel hydroxide particles, the ratio of the titanium element Ti based on the total weight of the nickel hydroxide particles and the conductive layer was 2.0 wt % as in the case of the example 1.

The ratio of each element (M1) of yttrium Y, ytterbium Yb, calcium Ca, aluminum Al, Erbium Er, gadolinium Gd, thulium Tm, lutetium Lu, zinc Zn, niobium Nb, tungsten W, and tantalum Ta in each compound which was thus added based on the total weight of the nickel hydroxide particles and the conductive layer was respectively 1.0 wt % in the examples E1 to E14 and 1.0 wt % in total containing 0.5 wt % of yttrium Y and 0.5 wt % of ytterbium Yb in the example E15 as shown in the following Table 6.

Except for the above, the same procedure as that in the example 1 was taken to form each of the nickel electrodes for alkaline storage battery, and except that each of the nickel electrodes for alkaline storage battery thus formed was used as the positive electrode, the same procedure as that in the example 1 was taken to fabricate each of alkaline storage batteries of the examples E1 to E15.

Subsequently, 5 cycles of charge/discharge were performed to each of the alkaline storage batteries of the examples E1 to E15 under the temperature condition of 25° C. to find the discharge capacity at the fifth cycle, then, the charge/discharge was performed repeatedly under the high temperature condition of 60° C. to find number of cycles until the discharge capacity was decreased to not more than 80% of the discharge capacity at the first cycle under the high temperature condition of 60° C.

The discharge capacity at the fifth cycle and the number of cycles of the alkaline storage battery of the example 1 was set to 100, to find the discharge capacity and the relative index of the number of cycles which were respectively regarded as the capacity performance and the charge/discharge cycle performance of the alkaline storage batteries of the examples E1 to E15. The results were shown in the Table 6.

TABLE 6

| | type of addition except $TiO_2$ | type of M1 | ratio of M1 (wt %) | capacity performance | charge/ discharge cycle performance |
|---|---|---|---|---|---|
| example E1 | Y | Y | 1 | 100 | 119 |
| example E2 | $Y(OH)_3$ | Y | 1 | 100 | 119 |
| example E3 | $Y_2O_3$ | Y | 1 | 100 | 123 |
| example E4 | $Yb_2O_3$ | Yb | 1 | 99 | 111 |
| example E5 | $Ca(OH)_2$ | Ca | 1 | 100 | 110 |
| example E6 | $Al(OH)_3$ | Al | 1 | 100 | 110 |
| example E7 | $Er_2O_3$ | Er | 1 | 100 | 110 |
| example E8 | $Gd_2O_3$ | Gd | 1 | 99 | 110 |
| example E9 | $Tm_2O_3$ | Tm | 1 | 98 | 111 |
| example E10 | $Lu_2O_3$ | Lu | 1 | 98 | 111 |
| example E11 | ZnO | Zn | 1 | 100 | 111 |
| example E12 | $Nb_2O_5$ | Nb | 1 | 100 | 118 |
| example E13 | $WO_3$ | W | 1 | 100 | 117 |
| example E14 | $Ta_2O_5$ | Ta | 1 | 100 | 116 |
| example E15 | $Y_2O_3$ $Yb_2O_3$ | Y Yb | 0.5 0.5 | 100 | 120 |
| example 1 | — | — | — | 100 | 100 |

As a result, each of the alkaline storage batteries of the examples E1 to E15 using the nickel electrodes for alkaline storage battery in which the above-mentioned Y powder and the like in addition to $TiO_2$ powder were added to the nickel hydroxide particles on which the conductive layer consisting of sodium-containing cobalt oxide was formed was improved in the charge/discharge cycle performance under high temperature conditions compared with the alkaline storage battery of the example 1. Especially, each of the alkaline storage batteries of the examples E1 to E3 and E12 to E15 to which the element selected from the group consisting of yttrium, niobium, tungsten, and tantalum was added was further improved in the charge/discharge cycle performance under high temperature conditions. In particular, each of the alkaline storage batteries of the examples E13 and E15 to which $Y_2O_3$ powder which was an yttrium compound was added was remarkably improved in the charge/discharge cycle performance under high temperature conditions.

EXAMPLES F1 to F12

In the examples F1 to F12, in forming the nickel electrode for alkaline storage battery, 9.71 g of aluminum sulfate $Al_2(SO_4)_3$ in the example F1, 8.6 g of manganese sulfate $MnSO_4$ in the example F2, 8.8 g of cobalt sulfate $CoSO_4$ in the example F3, 9.2 g of zinc sulfate $ZnSO_4$ in the example F4, 9.3 g of calcium sulfate $CaSO_4$ in the example F5, 6.83 g of magnesium sulfate $MgSO_4$ in the example F6, 13.04 g of yttrium sulfate $Y_2(SO_4)_3$ in the example F7, 17.98 g of ytterbium sulfate $Yb_2(SO_4)_3$ in the example F8, 18.0 g of manganese sulfate $MnSO_4$ in the example F9, 22.2 g of manganese sulfate $MnSO_4$ in the example F10, 4.2 g of manganese sulfate $MnSO_4$ and 4.28 g of cobalt sulfate $CoSO_4$ in the example F11, and 4.28 g of cobalt sulfate $CoSO_4$ and 4.6 g of zinc sulfate $ZnSO_4$ in the example F12 was respectively added to 167 g of nickel sulfate.

Subsequently, 5.0 wt % of ammonia water solution and 10.0 wt % of sodium hydroxide aqueous solution were dropped simultaneously into 5 liters of each aqueous solution in which the above-mentioned material was respectively dissolved. Each aqueous solution was reacted while adjusting the pH of the solution to around 11. The precipitate thus obtained was filtered, was rinsed, and was dried to obtain the nickel hydroxide particles in which each element (M2) Al, Mn, Co, Zn, Ca, Mg, Y, Yb was incorporated.

An atomic ratio of the each element (M2) based on the total weight of nickel Ni in the nickel hydroxide and each element (M2) Al, Mn, Co, Zn, Ca, Mg, Y, Yb which was respectively incorporated (Ni+M2) was 5 atomic % in the examples F1 to F8, 10 atomic % in the example F9, 12 atomic % in the example F10, 5 atomic % in total containing 2.5 atomic % of Mn and 2.5 atomic % of Co in the example F11, and 5 atomic % in total containing 2.5 atomic % of Co and 2.5 atomic % of Zn in the example F12 as shown in the following Table 7.

Except that each of the nickel hydroxide particles in which the above-mentioned each element (M2) was incorporated was used, the same procedure as that in the example 1 was taken to form each of the nickel electrodes for alkaline storage battery.

Except that each of the nickel electrodes for alkaline storage battery thus formed was used as the positive electrode, the same procedure as that in the example 1 was taken to fabricate each of the alkaline storage batteries of the examples F1 to F12.

Subsequently, 5 cycles of charge/discharge were performed to each of the alkaline storage batteries of the examples F1 to F12 under the temperature condition of 25° C. to find the discharge capacity at the fifth cycle, then, the charge/discharge was performed repeatedly under the high temperature condition of 60° C. to find number of cycles until the discharge capacity was decreased to not more than 80% of the discharge capacity at the first cycle under the high temperature condition of 60° C.

The discharge capacity at the fifth cycle and the number of cycles of the alkaline storage battery of the example 1 was set to 100, to find the discharge capacity and the relative index of the number of cycles which were respectively regarded as the capacity performance and the charge/discharge cycle performance of the alkaline storage batteries of the examples F1 to F12. The results were shown in the Table 7.

TABLE 7

| | type of M2 | M2/(Ni + M2) × 100 (atomic %) | capacity performance | charge/discharge cycle performance |
|---|---|---|---|---|
| example F1 | Al | 5 | 104 | 113 |
| example F2 | Mn | 5 | 102 | 112 |
| example F3 | Co | 5 | 104 | 118 |
| example F4 | Zn | 5 | 100 | 118 |
| example F5 | Ca | 5 | 101 | 115 |
| example F6 | Mg | 5 | 100 | 113 |
| example F7 | Y | 5 | 101 | 115 |
| example F8 | Yb | 5 | 100 | 110 |
| example F9 | Mn | 10 | 97 | 111 |
| example F10 | Mn | 12 | 89 | 112 |
| example F11 | Mn | 2.5 | 102 | 112 |
| | Co | 2.5 | | |
| example F12 | Co | 2.5 | 100 | 120 |
| | Zn | 2.5 | | |
| example 1 | — | — | 100 | 100 |

As a result, each of the alkaline storage batteries of the examples F1 to F12 using the nickel electrodes for alkaline storage battery which were using the nickel hydroxide particles in which the above-mentioned each element (M2) was incorporated was improved in the charge/discharge cycle performance under high temperature conditions compared with the alkaline storage battery of the example 1. Especially, each of the alkaline storage batteries of the examples F3, F4, and F12 was further improved in the charge/discharge cycle performance under high temperature conditions. However, the alkaline storage battery of the example F10 in which the weight ratio of M2 (Mn in the case of the example F10) to be incorporated was 12 atomic % was degraded in the capacity performance.

EXAMPLES G1 to G12

In the examples G1 to G12, except that the type of the alkaline electrolyte solution used in the above-mentioned alkaline storage battery of the example 1 was changed, the same procedure as that in the example 1 was taken to fabricate each of the alkaline storage batteries of the examples G1 to G12.

In the examples G1 to G12, the amount of KOH, NaOH, and LiOH.H$_2$O to be dissolved in the alkaline electrolyte solution per liter was respectively changed. Specifically, the amount was respectively set to 336.6 g of KOH, 20.0 g of NaOH, and 0.42 g of LiOH.H$_2$O in the example G1, 336.6 g of KOH, 20.0 g of NaOH, and 4.19 g of LiOH.H$_2$O in the example G2, 336.6 g of KOH, 20.0 g of NaOH, and 83.8 g of LiOH.H$_2$O in the example G3, 336.6 g of KOH, 20.0 g of NaOH, and 92.0 g of LiOH.H$_2$O in the example G4, 336.6 g of KOH, 4.0 g of NaOH, and 41.9 g of LiOH.H$_2$O in the example G5, 336.6 g of KOH, 8.0 g of NaOH, and 41.9 g of LiOH.H$_2$O in the example G6, 336.6 g of KOH, 160.0 g of NaOH, and 41.9 g of LiOH.H$_2$O in the example G7, 336.6 g of KOH, 168.0 g of NaOH, and 41.9 g of LiOH.H$_2$O in the example G8, 168.3 g of KOH, 20.0 g of NaOH, and 41.9 g of LiOH.H$_2$O in the example G9, 224.4 g of KOH, 20.0 g of NaOH, and 41.9 g of LiOH H$_2$O in the example G10, 561.0 g of KOH, 20.0 g of NaOH, and 41.9 g of LiOH.H$_2$O in the example G11, and 673.2 g of KOH, 20.0 g of NaOH, and 41.9 g of LiOH.H$_2$O in the example G12. The concentration (mol/l) of KOH, NaOH, and LiOH.H$_2$O in each of the alkaline electrolyte solutions of the examples G1 to G12 was respectively shown in the following Table 8.

Subsequently, 5 cycles of charge/discharge were performed to each of the alkaline storage batteries of the examples G1 to G12 under the temperature condition of 25° C. to find the discharge capacity at the fifth cycle, then, the charge/discharge was performed repeatedly under the high temperature condition of 60° C. to find number of cycles until the discharge capacity was decreased to not more than 80% of the discharge capacity at the first cycle under the high temperature condition of 60° C.

The discharge capacity at the fifth cycle and the number of cycles of the alkaline storage battery of the example 1 was set to 100, to find the discharge capacity and the relative index of the number of cycles which were respectively regarded as the capacity performance and the charge/discharge cycle performance of the alkaline storage batteries of the examples G1 to G12. The results were shown in the Table 8.

TABLE 8

| | KOH (mol/l) | NaOH (mol/l) | LiOH (mol/l) | capacity performance | charge/ discharge cycle performance |
|---|---|---|---|---|---|
| example 1 | 6.0 | 0.5 | 1.0 | 100 | 100 |
| example G1 | 6.0 | 0.5 | 0.01 | 95 | 88 |
| example G2 | 6.0 | 0.5 | 0.1 | 96 | 97 |
| example G3 | 6.0 | 0.5 | 2.0 | 100 | 101 |
| example G4 | 6.0 | 0.5 | 2.2 | 95 | 84 |
| example G5 | 6.0 | 0.1 | 1.0 | 97 | 87 |
| example G6 | 6.0 | 0.2 | 1.0 | 98 | 100 |
| example G7 | 6.0 | 4.0 | 1.0 | 101 | 103 |
| example G8 | 6.0 | 4.2 | 1.0 | 102 | 84 |
| example G9 | 3.0 | 0.5 | 1.0 | 92 | 87 |
| example G10 | 4.0 | 0.5 | 1.0 | 95 | 94 |
| example G11 | 10.0 | 0.5 | 1.0 | 103 | 98 |
| example G12 | 12.0 | 0.5 | 1.0 | 104 | 81 |

Each of the alkaline storage batteries of the examples 1, G2, G3, G6, G7, G10, and G11 using the alkaline electrolyte solution in which the concentration of KOH, NaOH, and LiOH was respectively in the range of 4.0 to 10.0 mol/l, 0.2 to 4.0 mol/l, and 0.1 to 2.0 mol/l was improved in the charge/discharge cycle performance under high temperature conditions compared with the alkaline storage batteries of the examples G1, G4, G5, G8, G9, and G12 using the alkaline electrolyte solution in which the mol concentration of KOH, NaOH, and LiOH was not in the above-mentioned range.

Although, the present invention has been fully described by way of examples, it is to be noted that various changes and modification will be apparent to those skilled in the art.

Therefore, unless otherwise such changes and modifications depart from the scope of the present invention, should be construed as being included therein.

What is claimed is:

1. A nickel electrode or alkaline storage battery formed by applying a paste containing active material particles composed of nickel hydroxide to a conductive substrate and drying said paste, wherein a conductive layer consisting of sodium-containing cobalt oxide is formed on a surface of said active material particles, and titanium powder and/or titanium compound powder is added to said active material particles.

2. The nickel electrode for alkaline storage battery according to claim 1, wherein a weight ratio of sodium element in said sodium-containing cobalt oxide is in a range of 0.1 to 10 wt %.

3. The nickel electrode for alkaline storage battery according to claim 1, wherein the weight ratio of cobalt element in said conductive layer consisting of the sodium-containing cobalt oxide based on the active material particles composed of nickel hydroxide is in the range of 1 to 10 wt %.

4. The nickel electrode for alkaline storage battery according to claim 1, wherein the weight ratio of titanium element in said titanium powder and/or said titanium compound powder to be added based on a total weight of the active material particles composed of nickel hydroxide and said conductive layer is in the range of 0.2 to 4.0 wt %.

5. The nickel electrode for alkaline storage battery according to claim 1, wherein an average particle diameter of said titanium powder and/or said titanium compound powder is not more than 100 μm.

6. The nickel electrode for alkaline storage battery according to claim 1, wherein at least one element selected from a group consisting of zinc, cobalt, calcium, magnesium, aluminum, manganese, yttrium, and ytterbium is incorporated into said active material particles composed of nickel hydroxide.

7. The nickel electrode for alkaline storage battery according to claim 6, wherein at least one element selected from zinc and cobalt is incorporated into said active material particles composed of nickel hydroxide.

8. The nickel electrode for alkaline storage battery according to claim 6, wherein a ratio of said element based on the total weight of nickel in said nickel hydroxide and said element is not more than 10 atomic %.

9. The nickel electrode for alkaline storage battery according to claim 1, wherein at least one element powder or its compound powder selected from the group consisting of yttrium, ytterbium, calcium, aluminum, erbium, gadolinium, thulium, lutetium, zinc, niobium, tungsten, and tantalum in addition to said titanium powder and/or said titanium compound powder are added.

10. The nickel electrode for alkaline storage battery according to claim 9, wherein at least one element powder and/or its compound powder selected from the group consisting of yttrium, niobium, tungsten, and tantalum in addition to said titanium powder and/or said titanium compound powder are added.

11. The nickel electrode for alkaline storage battery according to claim 9, wherein $Y_2O_3$ powder in addition to said titanium powder and/or said titanium compound powder are added.

12. An alkaline storage battery provided with a positive electrode, a negative electrode, and an alkaline electrolyte solution, wherein said positive electrode is a nickel for alkaline storage battery according to claim 1.

13. The alkaline storage battery according to claim 12, wherein said alkaline electrolyte solution contains potassium, lithium, and sodium.

14. The alkaline storage battery according to claim 13, wherein said alkaline electrolyte solution contains 4.0 to 10.0 mol/l of potassium hydroxide, 0.1 to 2.0 mol/l of lithium hydroxide, and 0.2 to 4.0 mol/l of sodium hydroxide.

* * * * *

UNITED STATES PATENT AND TRADEMARK OFFICE
CERTIFICATE OF CORRECTION

PATENT NO. : 6,835,497 B2
DATED : December 28, 2004
INVENTOR(S) : Takeshi Ogasawara et al.

It is certified that error appears in the above-identified patent and that said Letters Patent is hereby corrected as shown below:

Column 1,
Line 11, please correct "Ikaline" into -- alkaline --.

Column 2,
Line 16, please correct "are" into -- is --.

Column 5,
Line 10, please correct "TiO2.xH2O" into -- TiO2·xH2O --.

Column 7,
Line 14, please correct "cabalt" into -- cobalt --.
Line 38, please correct "LiOH.H$_2$O" into -- LiOH·H$_2$O --.

Column 11,
Line 47, please correct "examples A1" into -- example A1 --.
Line 51, please correct "examples A4" into -- example A4 --.

Column 18,
Lines 24-46, please correct "LiOH.H$_2$O" into -- LiOH·H$_2$O -- (all occurrences).

Column 19,
Line 38, please correct "or" into -- for --.

Column 20,
Line 48, please correct "a nickel for" into -- a nickel electrode for --.

Signed and Sealed this

Ninth Day of August, 2005

JON W. DUDAS
*Director of the United States Patent and Trademark Office*